US012766958B2

(12) United States Patent
Nash et al.

(10) Patent No.: US 12,766,958 B2
(45) Date of Patent: Oct. 20, 2026

(54) VEHICLE DISPLAY CONTROL

(71) Applicant: Ford Global Technologies, LLC, Dearborn, MI (US)

(72) Inventors: Brian Nash, Plymouth, MI (US); Kevin Lee Helpingstine, Ferndale, MI (US); Brendan Francis Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 18/599,537

(22) Filed: Mar. 8, 2024

(65) Prior Publication Data

US 2025/0282220 A1 Sep. 11, 2025

(51) Int. Cl.
*B60K 35/28* (2024.01)
*H04N 7/15* (2006.01)

(52) U.S. Cl.
CPC ............... *B60K 35/28* (2024.01); *H04N 7/15* (2013.01); *B60K 2360/195* (2024.01); *B60K 2360/741* (2024.01)

(58) Field of Classification Search
None
See application file for complete search history.

(56) References Cited

U.S. PATENT DOCUMENTS 9,860,709 B2 1/2018 Addepalli et al.
11,042,341 B2 * 6/2021 Rush ...................... G09G 5/377
11,109,152 B2 * 8/2021 Porta ........................ G06N 3/08
11,787,342 B2 * 10/2023 Solar ......................... B60R 1/29 348/148
2010/0127847 A1 * 5/2010 Evans ................. G06F 3/04886 345/173
2015/0054933 A1 * 2/2015 Wasiek ..................... B60R 1/12 348/77
2018/0194282 A1 * 7/2018 Wolterman ...... G08G 1/096791
2020/0213560 A1 * 7/2020 Zhang .................... B60K 35/10
2022/0229626 A1 * 7/2022 Lysdal .................... G06F 3/167
2023/0104622 A1 * 4/2023 Schubert .............. H04N 23/633 348/14.03
2025/0193343 A1 * 6/2025 Li ....................... B60W 60/001

OTHER PUBLICATIONS

White, J., "The BMW i7Has a Fold-Down Movie Screen," GEAR, Apr. 20, 2022, 7 pages.
"Is Byton's massive 48-inch screen a new interior design trope for electric vehicles?" Wallpaper, Oct. 25, 2022, 5 pages.
"All-New Aehra Suv Redefines In-Car Experience With Unprecedented Cabin Space, Materials and Technology," EN IT, Nov. 21, 2022, 6 pages.

* cited by examiner

*Primary Examiner* — Jennifer M Anda
(74) *Attorney, Agent, or Firm* — Frank Lollo; Brooks Kushman P.C.

(57) ABSTRACT

A computer includes a processor and memory, the memory can store instructions executable by the processor to transition a vehicle display from a vehicle monitored state to a content delivery state based on a placement of the vehicle in a non-monitored state, and to transition a control from a vehicle control state to a content delivery control state based on the placement of the vehicle in the non-monitored state.

15 Claims, 5 Drawing Sheets

VEHICLE DISPLAY CONTROL

BACKGROUND

A vehicle may include a monitoring system that includes one or more displays, indicators, and/or other devices capable of providing information to an operator. Vehicle monitoring system information may relate to an environment external to the vehicle, which may include relative positions of static or moving objects in a traffic environment, road markings and boundaries, buildings, bicycles, etc. A vehicle monitoring system may additionally provide information relating to components internal to a vehicle, such as engine operating parameters, battery state parameters, component operating temperatures, fluid pressures, etc.

DESCRIPTION

Figure 1:
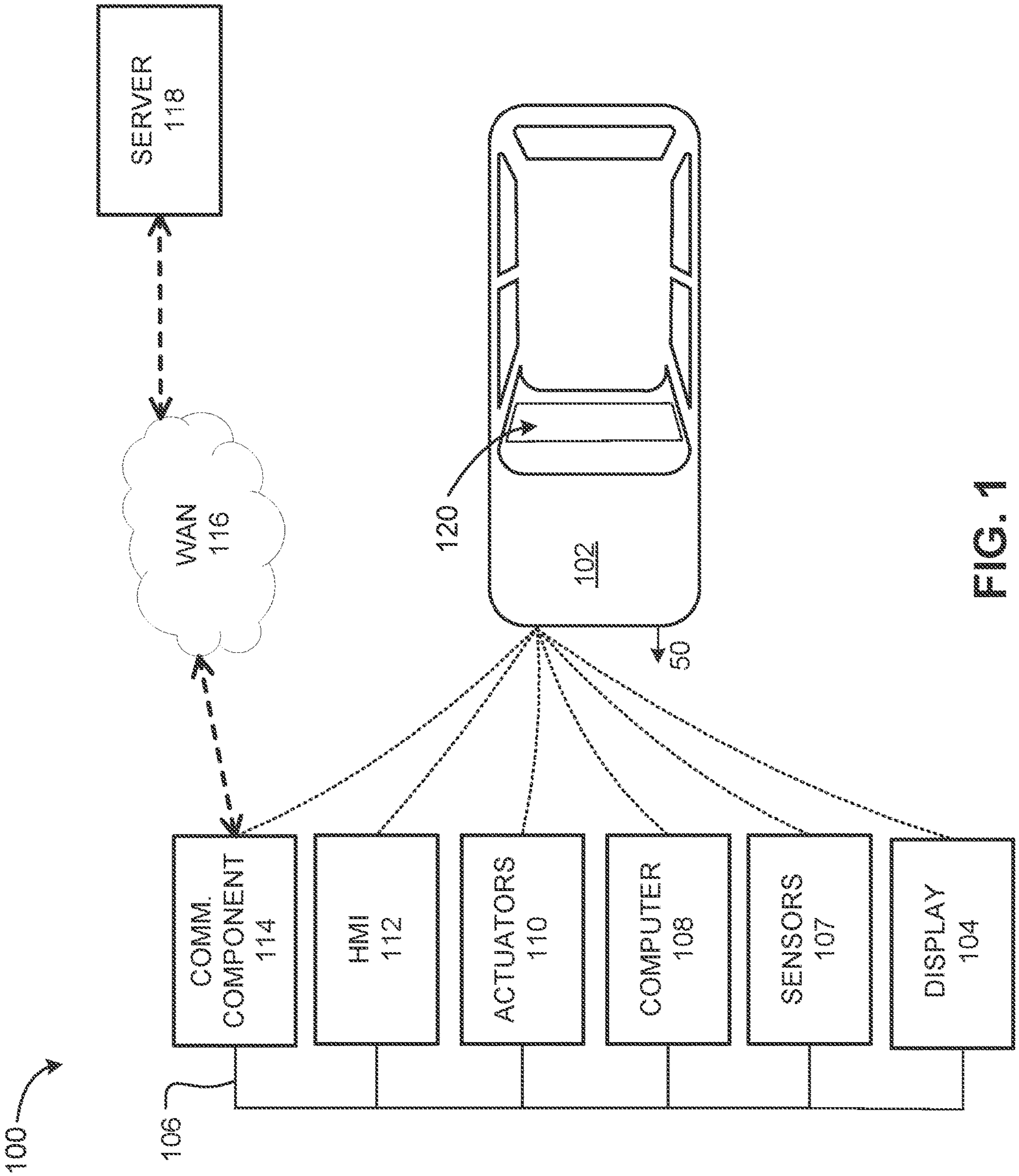
FIG. 1 is a block diagram of an example vehicle system.

During operation of a vehicle, a vehicle monitoring system may monitor and display information relating to a traffic environment, such as positions of static or moving objects relative to a vehicle. Such objects can include static or moving vehicles, bicycles, road markings, signposts, lampposts, buildings, etc. Such information, which may be gathered utilizing an externally-facing camera mounted on the vehicle, may assist an operator in obtaining and maintaining situational awareness of the traffic environment. Display devices of a vehicle monitoring system may be positioned on or in a vehicle dashboard beneath a lower boundary of the vehicle windshield so as to be viewable by the vehicle operator while the operator is focused on an object viewable through the vehicle windshield. In this context, a "display" means a physical device having a screen (such as a screen liquid-crystal-based-screen, light-emitting-diode-based screen, a plasma-based screen, etc.) that presents information in a visual form. In an example, displays of a vehicle monitoring system can be lengthened to extend across the vehicle dashboard so as to provide a panoramic display that extends from a left internal boundary of a forward portion of a vehicle interior to a right internal boundary of the forward portion of the vehicle interior, e.g., from side-to-side. Accordingly, an operator may be able to view at least a portion of the panoramic display while focusing on an object viewable through the vehicle windshield.

A vehicle monitoring system may monitor operations internal to the vehicle, such as operations relating to mechanical components, actuators, other vehicle systems and subsystems, etc. Thus, while operating a vehicle, a vehicle operator may maintain awareness of vehicle engine operating parameters, fuel and/or battery status, climate control settings, cruise control settings, radio settings, etc. Accordingly, a vehicle monitoring system, which may include a panoramic display, may assist in providing an operator with an overall driving experience that includes a capability for monitoring an environment external to the vehicle as well as monitoring an environment internal to the vehicle.

An overall driving experience can be enhanced by a facilitating capability for an operator to communicate wirelessly with others, such as by way of cellular communications that interoperate with a vehicle audio system, e.g., microphones, speakers, etc., operating within the vehicle's interior. As described in reference to examples herein, in response to a vehicle operator receiving a request for a videoconference, a display and a computing resource of a vehicle monitoring system can be utilized to permit the operator to participate in a videoconference. In an example as described further herein, in response to receiving a request for a videoconference, the operator may transition the vehicle monitoring system from a monitored state, which, in this context, means a vehicle monitoring system utilized to monitor a traffic environment and/or an environment internal to the vehicle, to a non-monitored state, which, in this context, means a vehicle monitoring system that is not utilized to monitor a traffic environment or environment internal to the vehicle. Also in this context, the term "videoconference" means a conference in which participants in different locations are able to communicate with each other in sound and/or vision. Accordingly, a videoconference may include multiparty audio telephony and/or video telephony or any other technique in which audio and/or video streams from a plurality of remote stations is assembled and presented at a destination receiver.

A vehicle monitoring system may be transitioned to a non-monitored state via an operator bringing the vehicle to an at-rest state, which, in this context, means exiting a traffic environment and placing the vehicle's transmission into a state that prevents movement of the wheels of the vehicle. Based on an onboard vehicle computer, e.g., computer 108 of FIG. 1, determining that the vehicle has been placed in an at-rest state, the vehicle monitoring system may be transitioned from a vehicle monitored state to a vehicle non-monitored state. In a vehicle non-monitored state, images from a camera mounted on an externally-facing surface of the vehicle may be suppressed and replaced by content delivered during a videoconferencing session. Accordingly, in this context, a "content delivery" state means an operating state in which images relating to the vehicle's external environment and/or the vehicle's internal environment are suppressed and replaced by videoconferencing content. In an example, in a content delivery state, images (e.g., real-time images) of videoconference participants, as well as content provided by a videoconference participant (e.g., view graphs that include still or video images) may be displayed in place of images of a vehicle's external environment and/or images relating to a vehicle's internal operating state. In an example, audio from videoconference participants can be presented to the operator via the vehicle's interior audio system.

Thus, in a content delivery state, an operator may participate in a videoconference utilizing vehicle displays viewable from the vehicle's interior. A vehicle interior camera, e.g., a dashboard camera, may be utilized to capture images of the operator as a videoconference participant. A vehicle interior audio system, e.g., a speaker, a microphone, etc., may be utilized to communicate audio signals between the vehicle operator and other videoconference participants. In an example, use of a panoramic display, which extends from a first location proximate to a left interior boundary to a second location proximate to a right interior boundary, can be populated with images from some or all videoconference participants and/or materials presented (e.g., view graphs, audio and/or video segments, etc.) during a videoconference. In an example, control elements, such as elements used to control radio settings, cruise control settings, etc., can be transitioned from a vehicle monitoring state to a vehicle non-monitoring state, e.g., to control videoconferencing features. Thus, in an example, haptic or tactile actuators, such as an actuator positioned in a driver side seat cushion, an actuator positioned in the vehicle steering wheel, etc., can be utilized to call the operator's awareness to certain content, e.g., posting of a videoconferencing chat message, which may have increased relevance to the operator. In another example, in a vehicle non-monitoring state, a haptic or tactile actuator may provide an indication that an operator has been mentioned, e.g., by name, and is being requested by a videoconference participant to maintain awareness of a particular portion of a videoconferencing session.

In an example, a system can include a computer having a processor and memory, the memory storing instructions executable by the processor to transition a vehicle display from a vehicle monitoring state to a content delivery state based on a placement of the vehicle in a non-monitored state. The system can also include instructions to transition a control from a vehicle control state to a content delivery control state based on the placement of the vehicle in the non-monitored state.

In an example, the non-monitored state can include a state of a vehicle transmission switch.

In an example, the display can extend across a dashboard of the vehicle from a first location proximate to a left interior boundary to a second location proximate to a right interior boundary.

In an example, the instructions to transition the vehicle display can include instructions to suppress display of images that represent an environment external to the vehicle.

In an example, the instructions to transition the vehicle display can include instructions to suppress display of operating parameters of a vehicle system.

In an example, the instructions to transition the control from the vehicle control state can include instructions to filter audio signals emanating from an interior portion of the vehicle to include audio exclusively emanating from an operator of the vehicle or from a predetermined occupant of the vehicle.

In an example, the content delivery state is a videoconferencing state that can permit display of content transmitted from a source external to the vehicle.

In an example, the instructions to transition the control from the vehicle control state can include instructions to modify a volume setting for audio directed to a videoconferencing participant.

In an example, the instructions to transition the control from the vehicle control state can include instructions to detect reorientation of head or facial features of an operator of the vehicle.

In an example, the instructions to transition the control from the vehicle control state can include instructions to generate an audio output responsive to determining that videoconferencing content pertains to an operator of the vehicle.

In an example, the instructions to transition the control from the vehicle control state can include instructions to generate a haptic output to an operator of the vehicle responsive to determining audio or video content that pertains to the operator of the vehicle.

In an example, the instructions to transition the control from the vehicle control state can include instructions to suppress video signals from an operator of the vehicle based on detecting that the operator of the vehicle has become disengaged from the videoconference.

In an example, the instructions to transition the control from the vehicle control state can include instructions to suppress a video portion of a videoconference responsive to a determination that the vehicle has been placed in a monitored state.

In an example, the instructions to transition the control from the vehicle control state can include instructions to maintain an audio portion of a videoconference responsive to a determination that the vehicle has been placed in a monitored state.

In an example, a method can include transitioning a vehicle display from a vehicle monitored state to a content delivery state based on a placement of the vehicle in a non-monitored state. The method can additionally include transitioning a control from a vehicle control state to a content delivery control state based on the placement of the vehicle in the non-monitored state.

In an example, determining that the vehicle has been placed in the non-monitored state can include determining a state of a vehicle transmission switch.

In an example, the vehicle display can extend across a dashboard of the vehicle from a first location proximate to a left interior boundary to a second location proximate to a right interior boundary.

In an example, transitioning the vehicle display can include suppressing display of images representing an environment external to the vehicle.

In an example, transitioning the vehicle display can include suppressing display of operating parameters of a vehicle system.

In an example, the content delivery state is a videoconferencing state, in which the videoconferencing state permits display of content transmitted from a source external to the vehicle.

As shown in FIG. 1, a system 100 includes a vehicle 102, that includes computer 108 that is communicatively coupled, via vehicle network 106, with various elements including sensors 107, actuators 110, such as steering, propulsion, braking, etc., human machine interface (HMI) 112, and communication component 114. Computer 108, and server 118, discussed below, include a processor and a memory. Memories of computer 108 and server 118, such as those described herein, include one or more forms of non-transitory media readable by computer 108, and can store first instructions executable by computer 108 for performing various operations, such that the vehicle computer is configured to perform the various operations, including those disclosed herein.

For example, computer 108 can include a generic computer with a processor and memory as described above and/or may comprise an electronic control unit (ECU) or a controller for a specific function or set of functions, and/or a dedicated electronic circuit including an ASIC (application specific integrated circuit) that is manufactured for a particular operation, (e.g., an ASIC for processing data from sensors and/or communicating data from sensors 107). In another example, computer 108 can include an FPGA (Field-Programmable Gate Array), which is an integrated circuit manufactured to be configurable by a user. In example embodiments, a hardware description language such as VHDL (Very High Speed Integrated Circuit Hardware Description Language) may be used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected or coupled to the FPGA circuit.) In some examples, a combination of processor(s), ASIC(s), and/or FPGA circuits may be included in computer 108. Further, computer 108 can include a plurality of computers in the vehicle (e.g., a plurality of ECUs or the like) operating together to perform operations ascribed herein to the computer 108.

The memory of computer 108 can be of any type, such as a memory that utilizes hard disk drives, solid state drives, or any volatile or non-volatile media. The memory can store the collected data transmitted by sensors 107. The memory can be a separate device from computer 108, and computer 108 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 108, for example, as a memory internal to computer 108.

Computer 108 can include or access instructions to operate one or more actuators 110 such as actuators connected to the brakes of vehicle 102, propulsion (e.g., one or more of an internal combustion engine, electric motor, hybrid engine, etc.), steering, climate control, interior and/or exterior lights, infotainment, navigation etc., as well as to determine whether and when computer 108, as opposed to a human operator, is to control such operations. Computer 108 can include or be communicatively coupled, e.g., via vehicle network 106, to more than one processor, which can be included in actuators 110, such as sensors 107, which may be utilized in vehicle electronic control units (ECUs) or the like included in the vehicle for monitoring and/or controlling various vehicle electromechanical components, e.g., a powertrain controller, a brake controller, a steering controller, etc.

Computer 108 can be generally arranged for communications on vehicle network 106 that can include a communications bus in the vehicle, such as a controller area network CAN or the like, and/or other wired and/or wireless mechanisms. Vehicle network 106 corresponds to a communications network, which can facilitate exchange of messages between various onboard vehicle devices, e.g., sensors 107, actuators 110, computer 108 and other computing resources onboard vehicle 102. Computer 108 can be generally programmed to send and/or receive, via vehicle network 106, messages to and/or from other devices in vehicle 102, e.g., any or all of ECUs, sensors 107, actuators 110, communications component 114, human machine interface (HMI) 112, display 104, etc.

Further, in implementations in which computer 108 actually comprises a plurality of devices, vehicle network 106 may be used for communications between devices represented as computer 108 in this disclosure. For example, vehicle network 106 can provide a communications capability via a wired bus, such as a CAN bus, a LIN bus, or can utilize any type of wireless communications capability. Vehicle network 106 can include a network in which messages are conveyed using any other wired communication technologies and/or wireless communication technologies, e.g., Ethernet, Wi-Fi®, Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices onboard a vehicle. For example, vehicle network 106 can include a CAN bus, in which some in-vehicle sensors and/or components communicate via a CAN bus, and a wired or wireless local area network in which some device in vehicle communicate according to Ethernet, Wi-Fi®, and/or Bluetooth communication protocols.

Vehicle 102 typically includes a variety of sensors 107. Sensors 107 include a devices that can obtain one or more measurements of one or more physical phenomena. Some of sensors 107 can assist computer 108 in monitoring the environment external to vehicle 102. For example, some of sensors 107 can include an externally facing camera, which may generate and transmit images to computer 108. Instructions executed by computer 108 can be combined with output signals from other sensors of sensors 107, such as radar sensors, lidar sensors, etc., which can provide a distance to, and/or a speed of, objects within the field of view of externally facing camera. In an example, instructions executed by computer 108 can generate symbols or other graphics that provide information relevant to a detected object, such as direction of movement of an object, speed of an object, distance to an object, etc.

Various sensors 107 may assist computer 108 in monitoring the operating environment internal to vehicle 102, such as speed sensors, torque sensors, braking sensors, temperature sensors, etc., which operate to monitor and/or control vehicle speed settings, vehicle towing parameters, vehicle braking parameters, engine torque output, engine and transmission temperatures, battery temperatures, vehicle steering parameters, etc. Various sensors 107 may assist in characterizing the physical environment of vehicle 102, such as outside air temperature, humidity, weather conditions (e.g., rain, snow, etc.), parameters related to the inclination or gradient of a road or other type of path on which the vehicle is proceeding, a particular ambient temperature, surface roughness of a road (e.g., on road versus off-road travel), etc. In example embodiments, sensors 107 can operate to detect the position or orientation of the vehicle utilizing, for example, signals from a satellite positioning system (e.g., global positioning system or GPS); accelerometers, such as piezo-electric or microelectromechanical systems MEMS; gyroscopes such as rate, ring laser, or fiber-optic gyroscopes; inertial measurement units IMU; and magnetometers.

Computer 108 can be configured for utilizing vehicle-to-vehicle (V2V) communications via communication component 114 and/or may interface with devices outside of the vehicle, e.g., through wide area network (WAN) 116 via V2V communications. Computer 108 can communicate outside of vehicle 102, such as via vehicle-to-infrastructure (V2I) communications, vehicle-to-everything (V2X) communications, or V2X including cellular communications C-V2X, and/or wireless communications cellular dedicated short range communications DSRC, etc. Communications outside of vehicle 102 can be facilitated by direct radio frequency communications and/or via server 118. Communications component 114 can include one or more mechanisms by which computer 108 communicates with computing entities outside of vehicle 102, including any desired combination of wireless, e.g., cellular, wireless, satellite, microwave, radio frequency communication mechanisms and any desired network topology or topologies when a plurality of communication mechanisms are utilized.

Vehicle 102 can include HMI 112 (human-machine interface), e.g., one or more of an infotainment display, a touchscreen display, a microphone, a speaker, etc. A user, such as the operator of vehicle 102, can provide input to devices such as computer 108 via HMI 112. HMI 112 can communicate with computer 108 via vehicle network 106, e.g., HMI 112 can send a message including the user input provided via a touchscreen of display 104, microphone 125, a camera that captures a gesture, etc., to computer 108, and/or can display output, e.g., via display 104, speaker, etc. In an example, operations of the HMI 112 can be included via instructions executed by computer 108. Alternatively or additionally, the HMI 112 can include a computing device to execute and/or control operations ascribed herein to the HMI 112.

During operation of vehicle 102 and a monitored state, HMI 112 can implement volume controls to control an onboard infotainment system, satellite radio system, etc., as well as providing controls for other onboard features of vehicle 102. HMI 112 can additionally generate haptic outputs to an operator, such as activating a haptic actuator located in the driver side seat or on the steering wheel. In an example, a haptic actuator may output a predetermined series of vibrations, e.g., a vibration at a specified intensity for a specified period of time, which may notify the operator of vehicle 102 of an approaching (second) vehicle. In another example, a haptic actuator may output of predetermined series of vibrations to notify the operator of vehicle 102 of upcoming traffic congestion along path 50. In another example, a haptic actuator located in the driver side seat of vehicle 102 may notify an operator of an incoming cellular telephone call.

WAN 116 can include one or more mechanisms by which computer 108 can communicate with server 118. Server 118 can include an apparatus having one or more computing devices, e.g., having respective processors and memories and/or associated data stores, which may be accessible via WAN 116. In example embodiments, vehicle 102 could include a wireless transceiver (i.e., transmitter and/or receiver) to send messages to (e.g., text, audio, still or video images, etc.) and receive messages from computing resources located outside of vehicle 102. Accordingly, WAN 116 can include one or more of various wired or wireless communication mechanisms, including any desired combination of wired e.g., cable and fiber and/or wireless, e.g., cellular, wireless, satellite, microwave, and radio frequency communication mechanisms and any desired network topology or topologies when multiple communication mechanisms are utilized. Exemplary communication networks include wireless communication networks, e.g., using Bluetooth, Bluetooth Low Energy BLE, IEEE 802.11, V2V or V2X such as cellular V2X CV2X, DSRC, etc., local area networks and/or wide area networks, including the Internet.

In an example, computer 108 can utilize one or more sensors 107 to determine a transition of vehicle 102 from a vehicle monitored state, such as during operation of vehicle 102 in a traffic environment, to a vehicle non-monitored state, such as responsive to vehicle 102 exiting a traffic environment and placing the transmission of vehicle 102 in "park," or any other state that represents a state in which the transmission of vehicle 102 prevents movement of the wheels of the vehicle. Based on vehicle 102 being transitioned from a vehicle monitored state to a vehicle non-monitored state, instructions executed by computer 108 can suppress images of, for example, the environment external to vehicle 102. In addition, based on transitioning of vehicle 102 from a vehicle monitored state to a vehicle non-monitored state, instructions executed by computer 108 can suppress display of parameters related to an internal operating environment of vehicle 102, such as sensors 107 to sense vehicle speed, engine torque, braking sensors, temperatures of components connected or coupled to actuators 110, etc.

Based on placement of vehicle 102 in a non-monitored state, instructions executed by computer 108 can transition display 104 to a content delivery state, in which content generated by server 118 can be displayed. In an example, server 118 can execute instructions to implement a videoconferencing bridge. In an example, a videoconferencing bridge may include a media server, a control unit, and a network interface. The control unit of server 118 may operate to track destination addresses of videoconference participants as well as tracking packets transmitted during the videoconference to determine whether transmitted packets reach an intended destination. The network interface of server 118 may operate to provide connectivity among videoconference participants and to determine whether transmitted packets arrive at an address of a conference participant in an intended order. The media server of server 118 may operate to encode images transmitted during the videoconference and to decode images received during the videoconference.

In an example, in a content delivery state, images (e.g., real-time images) of videoconference participants, as well as content provided by a videoconference participant (e.g., view graphs that include still or video images) may be displayed in place of images of a vehicle's external environment and/or images relating to a vehicle's internal operating state. In an example, display 104 can include multiple displays (e.g., 104A and 104B of FIGS. 2 and 3) to display images of videoconference participants (as further described in reference to FIG. 3) while camera 127 (of FIG. 2) captures still or moving images of the operator of vehicle 102. In an example, still or moving images of the operator of vehicle 102 can be processed by a videoconferencing bridge at server 118 to introduce blurring or removal of items in the background of the operator of vehicle 102, such as passengers positioned in the front or rear seats of vehicle 102, cargo secured within the interior of vehicle 102, etc. Alternatively or in addition, in a content delivery state, vehicle computer 108 can be trained during a calibration process to recognize cargo or other images aside from the operator of vehicle 102 so as to (without human input) recognize images of the interior of vehicle 102 and two blur or remove such images from video transmitted from the vehicle to server 118.

Audio from conference participants can be presented to the operator via an infotainment subsystem of vehicle 102. While display 104 operates in a content delivery state, haptic interfaces of HMI 112 can be utilized to provide outputs to the operator, such as via a haptic actuator on a steering wheel of vehicle 102. In one example, at the start of a videoconference, a haptic actuator positioned on a steering wheel of vehicle 102 can provide an output to the operator to take notice of the initiation of the videoconference. In another example, a haptic actuator positioned on the driver side seat may provide an output to the operator to take notice of content that may be of particular interest to the operator, such as posting of a videoconference text message. In an example, a videoconference participant may indicate that a particular portion of presented content may be of particular interest to the operator. In such an example, the videoconference participant may provide an output to the operator, which may be converted (e.g., via instructions executed by computer 108) to an activation of a steering wheel mounted or seat mounted haptic actuator.

Exemplary System Operations

Figure 2:
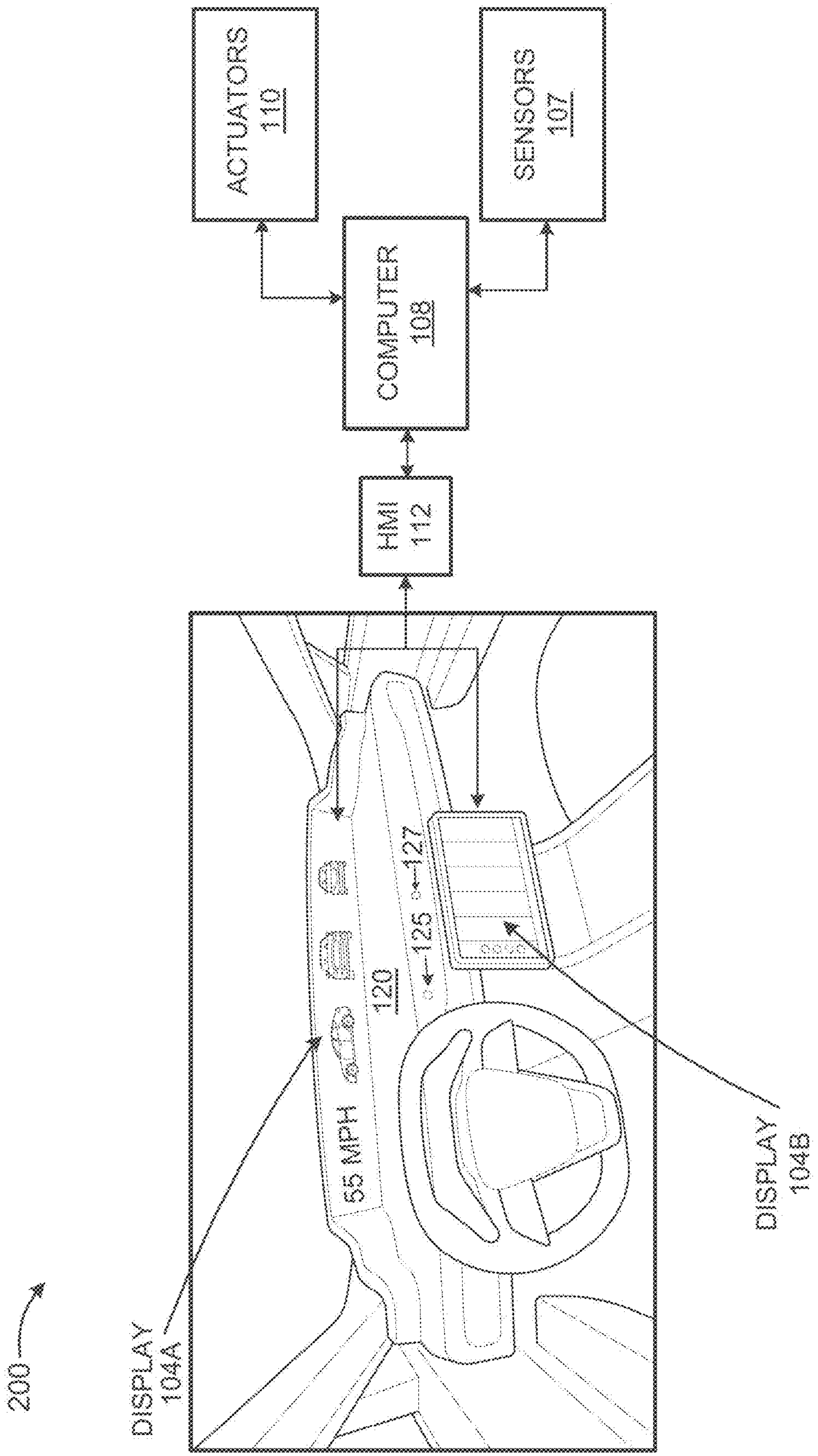
FIGS. 2 and 3 are diagrams showing displays positioned in an interior portion of a vehicle.

FIG. 2 is a diagram 200 showing displays positioned in an interior portion of vehicle 102. In the example of FIG. 2, vehicle 102 operates in a monitored state, in which an externally facing camera captures images of static or moving vehicles in the traffic environment of vehicle 102. Display 104A, which can include a panoramic display that extends across a dashboard of vehicle 102 from a first location proximate to a left interior boundary to a second location proximate to a right interior boundary. Display 104A can display information such as vehicle speed, vehicle direction of travel, operator alerts, etc. Display 104B may provide a touchscreen capability, which permits an operator of vehicle 102 to control settings of an onboard infotainment system (e.g., radio settings), climate control settings, seat positions, headlamp illumination, door lock/unlock status, etc. In the example of FIG. 2, images of vehicles operating in the traffic environment of vehicle 102 can be augmented utilizing inputs from one or more of sensors 107 (e.g., radar, lidar, etc.) to classify whether an object is static (e.g., a parked car) or moving (e.g., in traffic), so as to provide an operator of vehicle 102 with situational awareness of the status of objects/obstacles in the path of travel of vehicle 102. In an example, display 104B may display parameters related to operations internal to vehicle 102, such as an engine temperature, a time to a destination, a remaining fuel quantity or a battery state of charge, etc.

In the example of FIG. 2, camera 127 can be utilized to capture an image of an individual seated in the driver position of vehicle 102. After capturing an image of an individual seated in the driver position of vehicle 102, the computer 108 can execute instructions to determine whether an individual's facial and/or other features represent those of an authorized operator of vehicle 102. Accordingly, camera 127 interacting with computer 108 can be utilized in a facial recognition process to biometrically identify the individual, thereby allowing the individual to operate the vehicle and/or components thereof. Operation of the vehicle or vehicle components may include operations that utilize actuators 110 and may include operations such as starting the vehicle, controlling propulsion of the vehicle, steering the vehicle, accessing HMI 112, etc. In a facial recognition process, features of the individual's face and/or other portions of the individual may be compared with a set of stored facial and/or other parameters that permit computer 108 to identify an operator and to determine whether the operator is authorized to operate the vehicle and/or access or carry out other operations in the vehicle.

Microphone 125 can receive voice inputs and/or voice commands from an operator of vehicle 102. Accordingly, in one example, microphone 125 can receive a voice command, such as a command to start the engine of vehicle 102. Output signals from microphone 125 can be transmitted to HMI 112, which can process signals from microphone 125 and transmit a suitably formatted command (e.g., an engine start command) to computer 108. In an example, microphone 125 can be a directional microphone with a processor and memory that includes a capability to determine a direction from which an audio command emanates. Accordingly, in an example, microphone 125 is capable of determining whether an audio or voice signal emanates from an operator of vehicle 102, a passenger positioned at the right hand side of the driver, a passenger in a rear seat of vehicle 102, etc.

Figure 3:
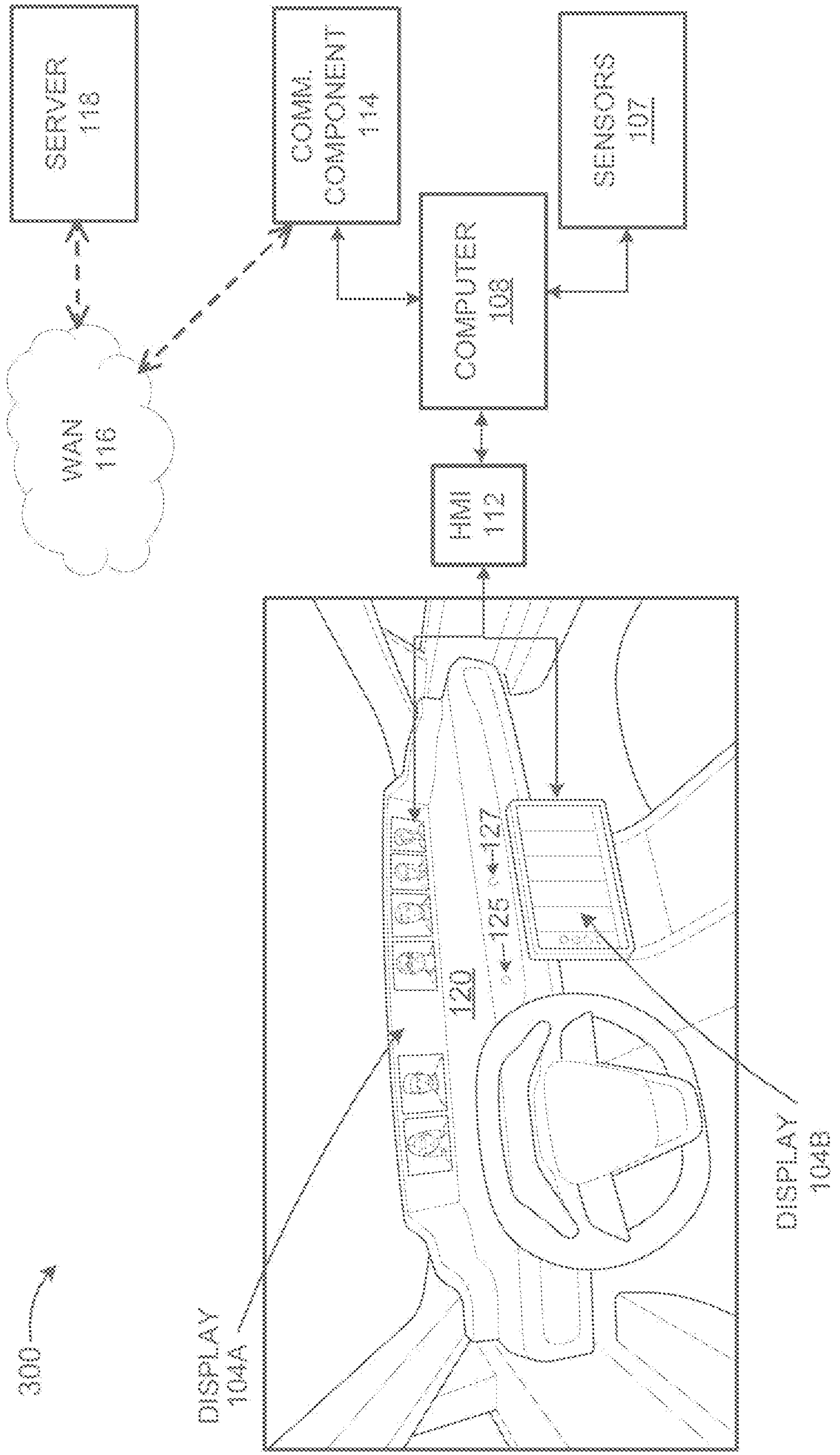

FIG. 3 is a diagram 300 showing displays positioned at in an interior portion of vehicle 102. In the example of FIG. 3, vehicle 102 operates in a non-monitored state, in which images captured by an externally facing camera are suppressed. Vehicle 102 may operate in a non-monitored state in response to an operator of the vehicle exiting a driving environment (e.g., positioning the vehicle at a parking lot) and placing the transmission of vehicle 102 in a state (e.g., a "park" state) that prevents movement of the wheels of the vehicle. Based on placement of vehicle 102 in a non-monitored state, instructions executed by computer 108 may transition vehicle displays 104A and 104B to a content delivery state. In a content delivery state, displays 104A and 104B may be capable of receiving videoconferencing transmissions from server 118, such as images of videoconference participants, content presented by videoconference participants (e.g., view graph materials, charts, multimedia segments, etc.).

In the example of FIG. 3, camera 127 can be utilized to capture an image of an individual seated in the driver position of vehicle 102 during a videoconferencing session. After capturing a still or moving image of an individual seated in the driver position of vehicle 102, instructions executed by computer 108 can operate to transmit the still or moving image of the individual to server 118. Accordingly, camera 127 interacting with computer 108, can be utilized to permit the operator of vehicle 102 to participate in a videoconferencing session. In an example, during operation of vehicle 102 in a non-monitored state, certain facial recognition processes, such as processes to permit an individual to start the vehicle, control propulsion of the vehicle, steer the vehicle, etc., can be suppressed. In an example, in a non-monitored state, a facial recognition process can be utilized to identify an operator of vehicle 102. Such identification can permit instructions executing on a videoconference bridge of server 118 to post the name of the operator or of another individual seated in the interior of vehicle 102.

In an example, in a non-monitored state, voice commands from the operator of vehicle 102 may also be suppressed. Accordingly, in an example, an audio signal processing capability of HMI 112, which operates to process signals from microphone 125 and transmit suitably formatted commands to HMI 112 (e.g., an engine start command) can be suppressed. Thus, audio signals from the operator may be transmitted via communications component 114 to server 118 without further processing by HMI 112 and/or computer 108. In an example, microphone 125 includes a directional microphone capable of determining a direction from which audio signals emanate. Accordingly, in an example, HMI 112 can operate to filter audio signals received by microphone 125 so as to transmit audio that exclusively emanates from the operator. Thus, during a videoconferencing session, audio signals emanating from passengers located within the interior of vehicle 102, who may be conversing between or among each other, can be deemphasized or removed from an audio stream transmitted to server 118. In another example, during a videoconferencing session, audio signals emanating from an individual positioned in the passenger seat can be emphasized (or amplified) while audio signals emanating from an individual positioned in the driver seat can be deemphasized or removed.

While vehicle 102 operates in a non-monitored state, HMI 112 can generate haptic outputs to an operator, such as activating a haptic actuator located in the driver side seat or on the steering wheel. In an example, a haptic actuator may output a predetermined series of vibrations, e.g., a vibration at a specified intensity for a specified period of time, which may notify the operator of vehicle 102 of the initiation of a videoconferencing session. In another example, a haptic actuator can notify the operator of vehicle 102 that a potential participant has requested access to the videoconference. In another example, a haptic actuator may output of predetermined series of vibrations to notify the operator of vehicle 102 that a videoconference participant has indicated that certain content is relevant to the operator. In another example, a haptic actuator located in the driver side seat of vehicle 102 may notify the operator of vehicle 102 that a text message has been posted during a videoconference session, that a potential participant is seeking entry into the videoconference session, that a participant has left the videoconference session, etc.

Figure 4:
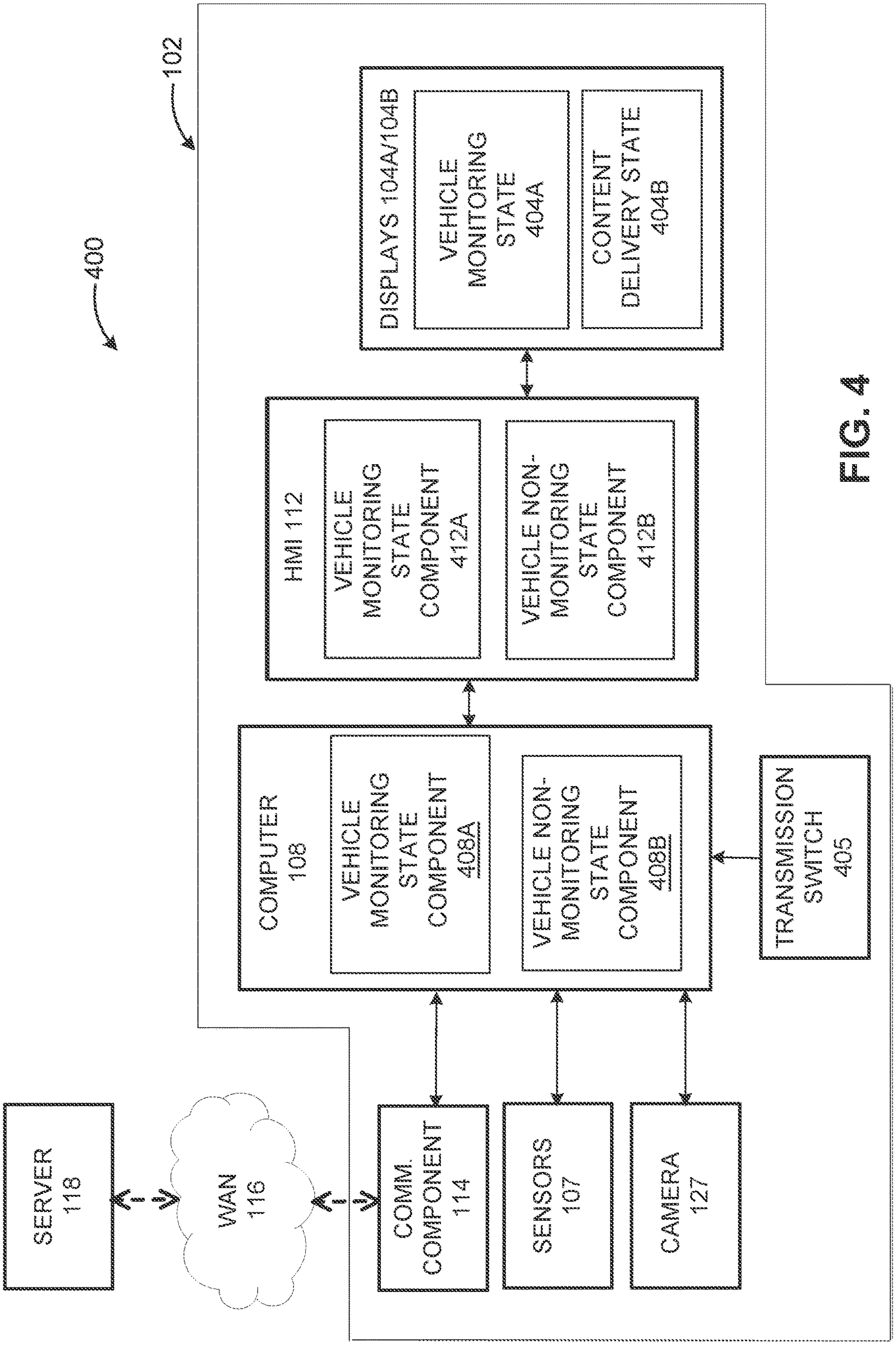
FIG. 4 is a block diagram showing vehicle operation of a vehicle system in a vehicle monitored state and in a vehicle non-monitored state.

FIG. 4 is a block diagram 400 showing vehicle operation of a vehicle system in a vehicle monitored state and in a vehicle non-monitored state. As illustrated in FIG. 4, computer 108, HMI 112, and displays 104A/104B are capable of operating in states representing vehicle monitored and vehicle non-monitored states. In an example, in a vehicle monitored state, computer 108 can execute vehicle monitoring state component 408A to monitor the environment external to vehicle 102 utilizing output signals from suitable sensors of sensors 107. Such sensors can include cameras, radar sensors, lidar sensors, etc. In an example, vehicle monitoring state component 408A additionally includes instructions to monitor the environment internal to vehicle 102 utilizing output signals from suitable sensors of sensors 107, which can include fuel level sensors, engine temperature sensors, wheel speed sensors, oil pressure and temperature sensors, etc.

In a vehicle monitored state, a processor coupled to a memory of HMI 112 can execute vehicle monitoring state component 412A to receive audio commands (e.g., via microphone 125) from an operator of vehicle 102 and to provide audio and/or haptic outputs to the operator. In an example, haptic outputs may notify the operator of an approaching (second) vehicle. In another example, a haptic actuator may output a predetermined series of vibrations to notify the operator of vehicle 102 of upcoming traffic congestion along path 50 (of FIG. 1). Such haptic outputs can include a vibration actuator in a driver side seat of vehicle 102, a vibration actuator in a steering wheel of the vehicle, or another haptic or tactile actuator located in an interior of the vehicle. In an example, in a vehicle monitored state, display 104A and/or display 104B can operate in vehicle monitoring state 404A to display static or moving objects viewable by an externally facing camera as well as to provide visual indications of the status of internal operating parameters of vehicle 102.

In the example of FIG. 4, based on the operator setting or placing transmission switch 405 of vehicle 102 into a state that prevents movement or rotation of the wheels of the vehicle, computer 108 can receive a signal from transmission switch 405 and transition the vehicle from a monitored state to a non-monitored state. In a vehicle non-monitored state, vehicle non-monitoring state component 408B can operate to suppress monitoring of the environment external to vehicle 102 and to suppress monitoring of an operating environment internal to the vehicle. In an example, based on the vehicle transitioning to the non-monitored state, computer 108 can execute instructions to output a signal to HMI 112 so as to instruct HMI 112 to execute instructions of vehicle non-monitoring state component 412B. In addition, based on the vehicle transitioning to the non-monitored state, computer 108 can execute instructions to output a signal to display 104A and/or display 104B so as to instruct a display to initiate content delivery state 404B.

In an example, based on receipt of an output signal from computer 108, HMI 112 can execute instructions of vehicle non-monitoring state component 412B. Instructions of vehicle non-monitoring state component 412B can operate to suppress receipt of audio commands from an operator of vehicle 102. In addition, component 412B can include instructions to suppress audio and/or haptic outputs relating to the environment external to the vehicle or to an operating environment internal to vehicle 102. In an example, non-monitoring state component 412B can operate to disable volume controls of HMI 112 that relate to an onboard infotainment system, a satellite radio system, etc., and permit such controls to modify a volume setting for audio from a videoconferencing participant. In an example, HMI 112 non-monitoring state component 412B can implement a plurality of volume controls, utilizing, for example, display 104B. Thus, in an example, the operator may be permitted to adjust (e.g., increase or decrease) a volume setting with respect to any selected participant present during the videoconferencing session.

In an example, non-monitoring state component 412B can include capability to display a scene captured by camera 127, which may permit an operator or passenger of vehicle 102 to select the individuals, e.g., via a touch screen of display 104B, that are to be visible to other participants of videoconference session. Alternatively or in addition, a touchscreen of display 104B may permit an operator to select items in the background of a scene captured by camera 127 that are to be blurred or removed from a video stream transmitted to other videoconference participants. Accordingly, in an example, an operator can select that a passenger be visible to other participants of a videoconference while blurring or replacing images of other passengers of vehicle 102, such as passengers positioned in a rear seat of the vehicle. In another example an operator can select an image of secured cargo, such as cargo positioned in a rear seat of vehicle 102, for blurring or removal from video transmitted to other videoconference participants. In an example, images removed from video transmitted to other video conference participants can be replaced by a background image, such as an image of an office environment or other setting.

Alternatively or in addition, vehicle computer 108 can be trained during a calibration process to recognize nonparticipant passengers, cargo, and/or other images present in the field of view of camera 127. In an example, during a calibration process, an off-line neural network can be trained so as to generate one or more parameters for uploading into a memory of computer 108. A parameter can permit instructions executed by computer 108 to recognize (e.g., without human input) images in the field of view of camera 127 that are aside from the operator of vehicle 102, such as images of passengers positioned in a rear seat or in the passenger seat of vehicle 102, secured cargo in the field of view of camera 127, etc., and to blur or remove such images from video transmitted to server 118. For example, during a calibration process, an off-line neural network, such as a convolutional neural network having at least three layers (i.e., an input layer, an output layer, and at least one hidden layer) can be utilized. In an example, the input layer of the neural network can operate to receive an image of an interior portion of vehicle 102, which includes images of an operator along with additional images, such as images that represent passengers, secured cargo, or other items aside from the operator. A loss function can then be computed to express a discrepancy between actual content of a scene of the interior of vehicle 102 and a decision presented at the output layer of the neural network. Via supervised learning, semi-supervised learning, reinforcement learning, etc., weighting functions of the hidden layer of the neural network can be adjusted to reduce one or more components of the loss function, thereby increasing the likelihood of the neural network correctly distinguishing an operator of vehicle 102 from passengers within the interior of vehicle 102. After the neural network has been suitably trained, weighting functions can be transformed into one or more parameters for uploading to computer 108. Accordingly, during operation of displays 104A and/or 104B in a content delivery state, computer 108 (operating in a vehicle non-monitoring state) can, without human input, blur or remove images aside from images corresponding to the operator of vehicle 102.

Vehicle non-monitoring state component 412B can additionally include instructions to actuate audio and/or haptic outputs to the operator that relate or pertain to, for example, activities related to videoconferencing capabilities. Accordingly, in response to instructions executed by a processor of server 118, HMI 112 can activate a vibration actuator in a driver side seat of vehicle 102, a vibration actuator in the steering wheel of vehicle 102, etc. In an example, in response to a potential videoconference participant seeking entry to an ongoing videoconference, vehicle non-monitoring state component 412B can activate an actuator in a driver side seat so as to provide the opportunity for the operator to admit the potential participant to the videoconference. In another example, in response to instructions executed by a processor of server 118 determining that content presented by a videoconference participant is of relevance to the operator of vehicle 102, HMI 112 can activate a vibration actuator and/or an audio output.

In another example, based on an operator appearing to be disengaged from a videoconference, vehicle non-monitoring state component 412B may interact with vehicle non-monitoring state component 408B to detect reorientation of head or facial features of an operator of the vehicle. Accordingly, in an example, in response to an image captured via a camera 127 indicating that the operator's head or face appears to be directed away from one or more of displays 104A and/or 104B (e.g., looking out of a side window of vehicle 102) vehicle non-monitoring state component 412B can activate a haptic actuator and/or an audio output to the operator to take notice of an ongoing videoconference.

In an example, at the conclusion of a videoconference, computer 108, HMI 112, and one or more of displays 104A and 104B can return to a vehicle monitoring state (e.g., 408A, 412A, and 404A). A return to a monitoring state can be triggered in accordance with vehicle non-monitoring state component 408B of computer 108 receiving a signal from server 118. Alternatively or in addition, a return to a monitoring state can be triggered by vehicle non-monitoring state component 408B detecting a change of state of transmission switch 405. The change of state of transmission switch 405 can be based on an operator placing or setting a transmission switch 405 of vehicle 102 into a state that permits movement or rotation of the wheels of vehicle 102.

Figure 5:
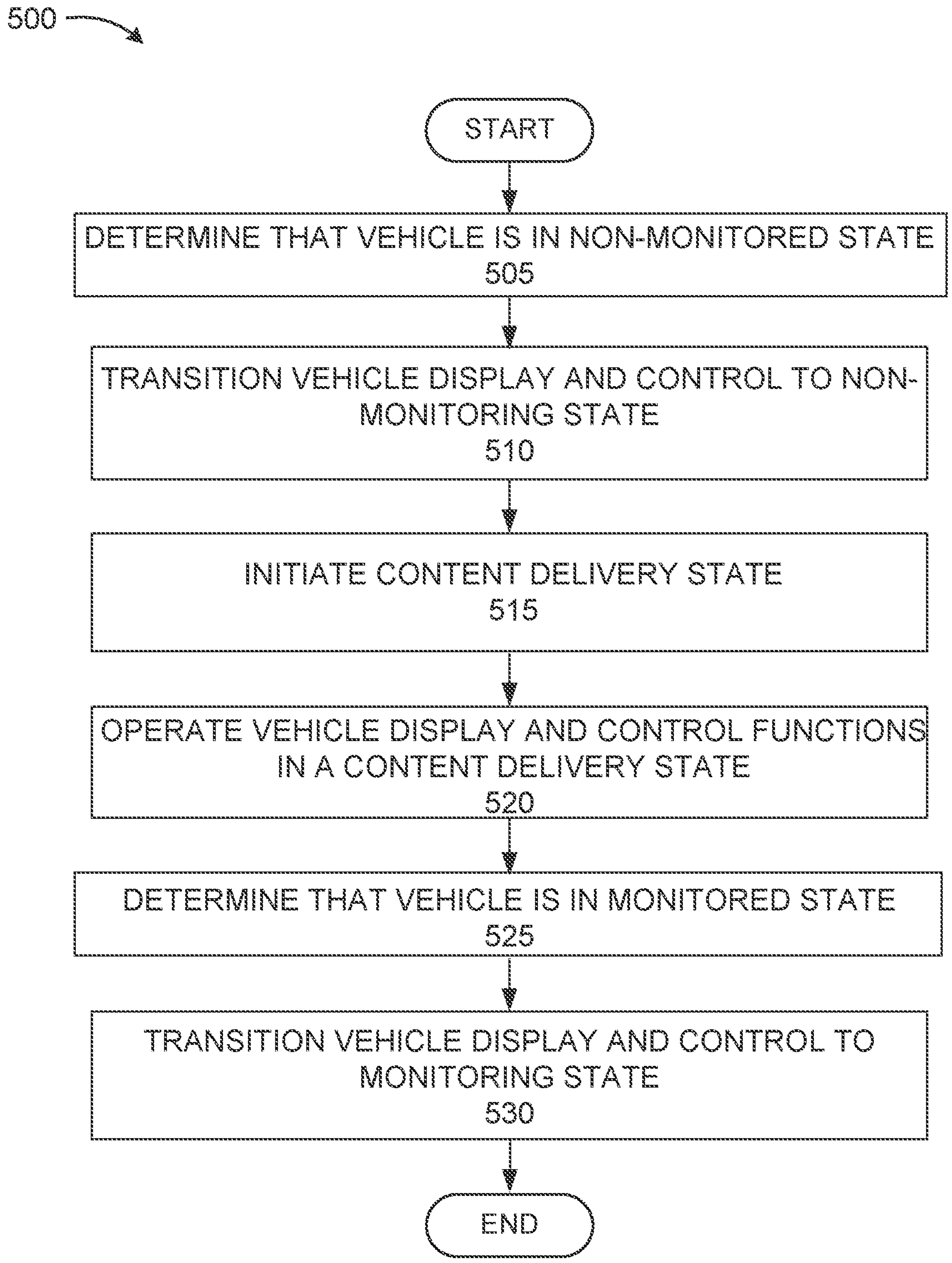
FIG. 5 is a flowchart of an example method for transitioning between a vehicle monitored state and a vehicle non-monitored state.

FIG. 5 is a flowchart of an example method or process 500 for controlling a display 104, including transitioning between a vehicle monitored state and a vehicle non-monitored state. As a general overview, process 500 can include an operator placing the vehicle into a non-monitored state, such as by placing the transmission of vehicle 102 in "park," or another state in which the transmission of the vehicle prevents movement of the wheels. Based on vehicle 102 being placed in a non-monitored state, vehicle displays 104A and/or 104B can transition to a content delivery state. In a content delivery state, display of an environment external to vehicle 102 and display of parameters relating to operations internal to the vehicle are suppressed. In the content delivery state, a videoconference or other content delivery activity (e.g., real-time videoconferencing, video telephony, etc.) can be initiated. During operation in a content delivery state, vehicle displays 104A and/or 104B can operate to present images of videoconference participants and content shared by videoconference participants. In addition, during operation in a content delivery state, HMI 112 can operate to provide haptic and/or audio alerts in the form of audio signaling, activation of a vibration actuator in a driver's seat or in a steering wheel, etc. Further, during operation in a content delivery state, vehicle infotainment controls, radio settings, etc., may be disabled to permit an operator to adjust volume from a videoconference participant. In response to the vehicle being placed into a monitored state, such as by placing the transmission of vehicle 102 in "drive," "reverse," or other setting that permits movement of the wheels of the vehicle, the vehicle may return to a monitored state. In a monitored state, presentation of videoconferencing content can be suppressed so that images of an environment external to vehicle 102 and parameters related to internal operations of the vehicle can be displayed. In an example, after placing the transmission of vehicle 102 into a setting that permits movement of the wheels of the vehicle, HMI 112 can maintain audio communications with videoconference participants so as to permit the operator of vehicle 102 to continue communicating with videoconference participants while operating vehicle 102 in a traffic environment.

Process 500 begins at block 505, which includes determining that vehicle 102 has been set or placed in a non-monitored state. In an example, computer 108 may determine that vehicle 102 has been placed in a non-monitored state by detecting transmission switch 405 of the vehicle being set or placed in a "park" state or in another state which the transmission of the vehicle prevents movement of the wheels.

Process 500 continues at block 510, which includes computer 108 of vehicle 102 transitioning the vehicle display and control from a monitoring state to a non-monitoring state. In a non-monitoring state, images, symbols, and other graphics that display information relative to a detected object external to vehicle 102 can be suppressed. In addition, in a non-monitoring state, display of images related to the operating environment internal to vehicle 102, such as display of parameters related to engine speed, engine and transmission temperatures, battery temperatures, etc., can also be suppressed. In an example, block 510 can include computer 108 transitioning from executing instructions of vehicle monitoring state component 408A to executing instructions of vehicle non-monitoring state component 408B. In an example, block 510 can include HMI 112 transitioning from executing instructions of vehicle monitoring state component 412A to vehicle non-monitoring state component 412B.

Process 500 continues at block 515, which includes computer 108 of vehicle 102 transitioning displays 104A and/or 104B from vehicle monitoring state 404A to content delivery state 404B. In a content delivery state, content from an external server that implements, e.g., a videoconference bridge, can be displayed utilizing one or more of the transitioned displays. In response to initiating a content delivery state, display 104A can display images of videoconference participants, content (e.g., charts, view graphs, still or video images, etc.) can be displayed using, e.g., a panoramic display of the vehicle that extends across the dashboard of the vehicle from a first location proximate to a left interior boundary of the interior of vehicle 102 to a second location proximate to a right interior boundary of the vehicle. Alternatively or in addition, display 104B, which may be positioned beneath dashboard 120 of vehicle 102, can display additional videoconference related information such as a listing of participants, time remaining in a videoconference, a videoconference title, etc. In an example, microphone 125 can be used to receive audio from the operator of vehicle 102 and transmit the received audio to videoconference participants as directed by a videoconferencing bridge executed via server 118. Audio from videoconference participants can be transmitted to the operator via an audio system located in the vehicle's interior. In in content delivery state 404B, vehicle computer 108 can utilize one or more parameters to blur or remove images of passengers positioned in the passenger seat of vehicle 102, passengers positioned in the rear of vehicle 102, and/or cargo secured within the interior of vehicle 102. Such blurring or removal of images can occur responsive to an operator of vehicle 102, for example, selecting to remove certain images from video transmitted from vehicle 102. Alternatively or in addition, blurring or removal of images can occur without operator input, such as via off-line training of a neural network, which may result in an upload of one or more parameters to vehicle computer 108.

Process 500 continues at block 520, which includes operating vehicle display and control functions in a content delivery state. In an example, non-monitoring state component 412B can operate to disable volume controls of HMI 112 that relate to an onboard infotainment system, a satellite radio system, etc., and permit such controls to modify a volume setting for audio from a videoconferencing participant. In an example, HMI 112 non-monitoring state component 412B can implement a plurality of volume controls, utilizing, for example, display 104B. In an example, the operator may be permitted to adjust (e.g., increase or decrease) a volume setting from any selected participant present during the videoconferencing session. Block 520 can additionally include HMI 112 activating a haptic actuator and/or an audio output to the operator to take notice of content presented during the videoconference.

Process 500 continues at block 525, which includes determining that the vehicle has transitioned to a monitored state. In an example, a transition to a monitored state can be based on a detected change in the state of transmission switch 405, which can be transitioned from a state that prevents movement of the wheels of the vehicle to a state that permits movement of the wheels.

Process 500 continues at block 530, which includes, in response to detection of the change of state of transmission switch 405, transitioning of vehicle displays 104A and/or 104B from a content delivery state to a state that permits display of aspects of an environment external to vehicle 102 and aspects of an operating environment internal to the vehicle. In an example, block 530 can include computer 108 transitioning from executing instructions of vehicle non-monitoring state component 408B to executing instructions of vehicle monitoring state component 408A. In an example, block 530 can include HMI 112 transitioning from executing instructions of vehicle non-monitoring state component 412B to vehicle monitoring state component 412A. In an example, block 530 can include displays 104A and/or 104B transitioning from content delivery state 404B to vehicle monitoring state 404A. In an example, block 530 can include HMI 112 maintaining audio communications with videoconference participants so as to permit the operator of vehicle 102 to continue communicating with videoconference participants while operating vehicle 102 in a traffic environment.

After completing block 530, process 500 ends.

Operations, systems, and methods described herein should always be implemented and/or performed in accordance with an applicable owner's/user's manual and/or safety guidelines.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an onboard vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and memory, the memory storing instructions executable by the processor to:

transition a vehicle display from a monitored state to a content delivery state based on a placement of the vehicle in a non-monitored state; and transition a control from a vehicle control state to a content delivery control state based on the placement of the vehicle in the non-monitored state, including suppressing display of operating parameters determined from vehicle sensor data about vehicle propulsion, steering, and/or braking;

wherein the content delivery state is a videoconferencing state, the videoconferencing state permitting display of content transmitted from a source external to the vehicle, and the instructions include instructions to, in response to transitioning the control from the vehicle control state to the content delivery state, based on user input, modify a volume setting of an audio output by a vehicle interior audio system for audio, received in the vehicle from the source external to the vehicle, for a selected videoconferencing participant.

2. The system of claim 1, wherein the non-monitored state includes a state of a vehicle transmission switch.

3. The system of claim 1, wherein the vehicle display extends across a dashboard of the vehicle from a first location proximate to a left interior boundary to a second location proximate to a right interior boundary.

4. The system of claim 1, wherein the instructions to transition the vehicle display include instructions to suppress display of images that represent an environment external to the vehicle.

5. The system of claim 1, wherein the instructions to transition the control from the vehicle control state include instructions to filter audio signals emanating from an interior portion of the vehicle to include audio exclusively emanating from an operator of the vehicle or from a passenger of the vehicle.

6. The system of claim 1, wherein the instructions to transition the control from the vehicle control state include instructions to detect reorientation of head or facial features of an operator of the vehicle.

7. The system of claim 1, wherein the instructions to transition the control from the vehicle control state include instructions to generate the audio output responsive to determining that videoconferencing content pertains to an operator of the vehicle.

8. The system of claim 1, wherein the instructions to transition the control from the vehicle control state include instructions to generate a haptic output to an operator of the vehicle responsive to determining audio or video content that pertains to the operator of the vehicle.

9. The system of claim 1, wherein the instructions to transition the control from the vehicle control state include instructions to suppress video signals from an operator of the vehicle based on detecting that the operator of the vehicle has become disengaged from the videoconference.

10. The system of claim 1, wherein the instructions to transition the control from the vehicle control state include instructions to suppress a video portion of a videoconference responsive to a determination that the vehicle has been placed in the monitored state.

11. The system of claim 1, wherein the instructions to transition the control from the vehicle control state include instructions to maintain an audio portion of a videoconference responsive to a determination that the vehicle has been placed in the monitored state.

12. A method, comprising:

transitioning a vehicle display from a monitored state to a content delivery state based on a placement of the vehicle in a non-monitored state; and transitioning a control from a vehicle control state to a content delivery control state based on the placement of the vehicle in the non-monitored state, including suppressing display of operating parameters determined from vehicle sensor data about vehicle propulsion, steering, and/or braking;

wherein the content delivery state is a videoconferencing state, the videoconferencing state permitting display of content transmitted from a source external to the vehicle; and in response to transitioning the control from the vehicle control state to the content delivery state and based on user input, modifying a volume setting of an audio output by a vehicle interior audio system for audio, received in the vehicle from the source external to the vehicle, for a selected videoconferencing participant.

13. The method of claim 12, wherein determining that the vehicle has been placed in the non-monitored state comprises determining a state of a vehicle transmission switch.

14. The method of claim 12, wherein the vehicle display extends across a dashboard of the vehicle from a first location proximate to a left interior boundary to a second location proximate to a right interior boundary.

15. The method of claim 12, wherein transitioning the vehicle display includes suppressing display of images representing an environment external to the vehicle.

* * * * *